(12) United States Patent
Das et al.

(10) Patent No.: US 11,252,061 B1
(45) Date of Patent: Feb. 15, 2022

(54) DISTRIBUTED COMPUTATION OF GRAPH EMBEDDINGS FOR NETWORK TRAFFIC IN VIRTUAL NETWORKS

(71) Applicant: VMware, Inc., Palo Alto, CA (US)

(72) Inventors: Kamalika Das, Sunnyvale, CA (US); Arnold Koon-Chee Poon, San Mateo, CA (US); Farzad Ghannadian, Burlingame, CA (US)

(73) Assignee: VMWARE INC., Palo Alto, CA (US)

( * ) Notice: Subject to any disclaimer, the term of this patent is extended or adjusted under 35 U.S.C. 154(b) by 0 days.

(21) Appl. No.: 17/090,745

(22) Filed: Nov. 5, 2020

(51) Int. Cl.
*H04L 12/26* (2006.01)
*H04L 12/24* (2006.01)
*G06N 3/04* (2006.01)
*G06F 9/455* (2018.01)

(52) U.S. Cl.
CPC ........ *H04L 43/045* (2013.01); *G06F 9/45558* (2013.01); *G06N 3/0472* (2013.01); *H04L 41/12* (2013.01); *H04L 41/16* (2013.01); *H04L 41/22* (2013.01); *H04L 43/0876* (2013.01); *G06F 2009/45595* (2013.01)

(58) Field of Classification Search
CPC ... H04L 41/12–16; H04L 41/22; H04L 43/04; H04L 43/045
See application file for complete search history.

(56) References Cited

U.S. PATENT DOCUMENTS

| 7,830,815 | B1* | 11/2010 | Koren | H04L 41/12 |
| | | | | 370/252 |
| 2018/0227243 | A1* | 8/2018 | Zhang | H04L 41/12 |
| 2020/0162340 | A1* | 5/2020 | Rossi | H04L 41/12 |
| 2020/0177466 | A1* | 6/2020 | Rossi | G06N 20/00 |
| 2021/0006471 | A1* | 1/2021 | Kvasyuk | H04L 47/127 |
| 2021/0014124 | A1* | 1/2021 | Rossi | H04L 41/145 |
| 2021/0160142 | A1* | 5/2021 | Thai | H04L 41/0813 |

* cited by examiner

*Primary Examiner* — Brendan Y Higa

(57) ABSTRACT

In one set of embodiments, a host system can perform a random walk along a graph representing network traffic in a virtual network, where the virtual network comprises a plurality of virtual machines (VMs) running on a plurality of host systems including the host system, and where the random walk starts from a node of the graph corresponding to a VM running on the host system. The host system can further construct, based on the random walk, a local neighborhood of VMs associated with the VM and determine, based on the local neighborhood, whether the VM is a localized VM. Upon determining that the VM is not a localized VM, the host system can transmit a random walk data entry identifying the VM and the local neighborhood to a server communicatively coupled with the plurality of host systems.

21 Claims, 5 Drawing Sheets

DISTRIBUTED COMPUTATION OF GRAPH EMBEDDINGS FOR NETWORK TRAFFIC IN VIRTUAL NETWORKS

BACKGROUND

Unless otherwise indicated, the subject matter described in this section is not prior art to the claims of the present application and is not admitted as being prior art by inclusion in this section.

Network analytics platforms collect and analyze data regarding the traffic flowing through computer networks in order to identify and address various problems (e.g., performance issues, network security attacks/exploits, etc.). This network traffic data—which typically takes the form of <source address, destination address, port, protocol> tuples identifying network flows—inherently conforms to the notion of a graph, where each vertex (i.e., node) in the graph represents a network endpoint and where each edge in the graph represents an observed network flow between two network endpoints. Accordingly, it is beneficial for network analytics platforms to employ graph-based machine learning (ML) algorithms, such as graph-based classification, graph-based anomaly detection, and so on as part of their network traffic analyses.

An initial step in applying a graph-based ML algorithm to a graph is computing a "graph embedding," which means converting the graph from a discrete node and edge-based representation into a continuous vector representation. This computation generally involves calculating and assigning to each graph node a "node embedding" corresponding to a vector of features in a low-dimensional feature space, with the condition that nodes which are "similar" in the graph (e.g., are connected and/or share common structural roles) are assigned node embeddings which are relatively close to each other in the low-dimensional feature space. This allows the node embeddings to capture, at least in an approximate sense, the graph's geometric structure. Upon completing the graph embedding computation, the node embeddings that collectively form the graph embedding can be used to train and apply many common types of ML models (e.g., neural network classifiers, random forest classifiers, etc.).

One challenge with computing a graph embedding for a graph representing network traffic is that information regarding the graph's connectivity may be spread across multiple machines, but the entirety of this connectivity information is needed by the entity carrying out the graph embedding computation. If the computation entity is a centralized machine/server, this means the graph connectivity information must be transmitted to that entity, which has an associated bandwidth cost. In addition, the computation entity must be provisioned with sufficient storage and compute resources to store the entire graph connectivity dataset and to calculate node embeddings for all of the nodes of the graph.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof

1. Overview

The present disclosure is directed to techniques for computing, in a distributed fashion, a graph embedding for a graph G representing the network traffic in a virtual network X. As used herein, a "virtual network" is a computer network in which one or more network endpoints are virtual machines (VMs). Virtual networks are commonly implemented in data centers and other computing environments that consist of host systems running VMs in order to interconnect the VMs with each other and with other virtual or physical devices/networks.

At a high level, the techniques of the present disclosure distribute the graph embedding computation for G across a plurality of host systems whose VMs are network endpoints in X and a management server communicatively coupled with the host systems in a manner that leverages the host system-level locality of the VMs and their associated graph connectivity information (e.g., random walk data). This eliminates the need to push the entirety of that graph connectivity information from the host systems to the management server, which in turn reduces the bandwidth requirements for the computation and allows for load balancing of the computation's storage and compute overheads. These and other aspects are described in further detail in the sections that follow.

2. Computing Environment and Solution Architecture

Figure 1:
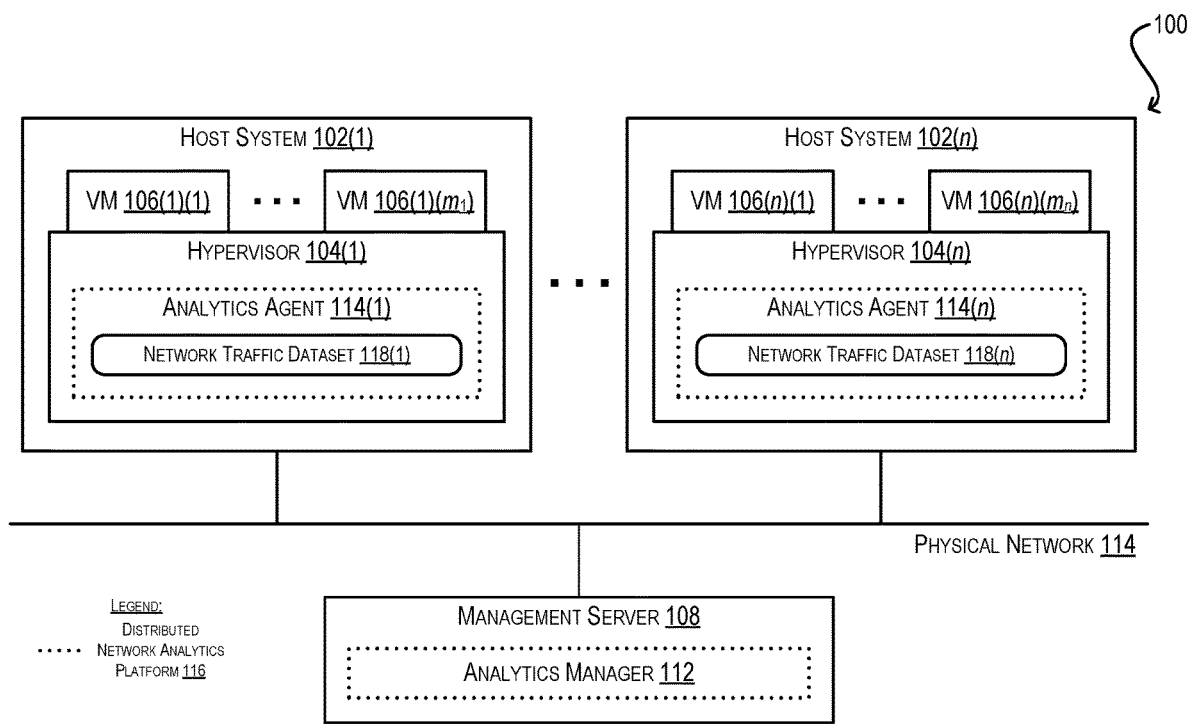
FIG. 1 depicts an example computing environment.

FIG. 1 depicts an example computing environment 100 in which embodiments of the present disclosure may be implemented. As shown, computing environment 100 comprises a number of host systems 102(1)-102(n) where each host system 102(i) (for i=1, . . . n) includes a virtualization software layer (i.e., hypervisor) 104(i) and a plurality of VMs 106(i)(1)-106(i)($m_i$). The VMs in computing environment 100 are assumed to be interconnected—through virtual networking components integrated into hypervisors 104(1)-104(n)—according to a virtual network X, which allows the VMs to communicate with each other as distinct network endpoints and in a manner that is independent of the physical network topology of computing environment 100. For example, if host system 102(1) includes three VMs 106(1)(1), 106(1)(2), and 106(1)(3), each of these VMs will be assigned a unique network address in virtual network X (even though they all run on the same physical host system 102(1)) and will be capable of exchanging network traffic with each other and with the VMs of other host systems via X.

In addition to host systems 102(1)-102(n), computing environment 100 comprises a management server 108 that is communicatively coupled with these host systems via a physical network 110. As shown, management server 108 includes an analytics manager 112 that, together with analytics agents 114(1)-114(n) running in the hypervisors of host systems 102(1)-102(n), implements a distributed network analytics platform 116. Distributed network analytics platform 116 is configured to execute and/or provide various functions pertaining to the management, analysis, and visualization of network flows within virtual network X For example, in one set of embodiments, each analytics agent 114($i$) of platform 116 can locally collect data regarding the virtual network traffic transmitted or received by VMs 106($i$)(1)-106($i$)($m_i$) running on its respective host system 102($i$). This collected network traffic data is depicted in FIG. 1 as network traffic datasets 118(1)-118($n$). Distributed network analytics platform 116 can then carry out one or more analyses on the collected data in order to detect network performance problems, anomalous network activity, and other issues.

As mentioned in the Background section, network traffic data inherently conforms to the notion of a graph. Accordingly, it is beneficial for distributed network analytics platform 116 to (a) construct a graph G based on the network traffic data collected for virtual network X (such that each node in G represents a network endpoint (i.e., VM) in X and each edge in G represents a network flow between two endpoints) and (b) apply one or more graph-based ML algorithms to graph G as part of its network traffic analyses. However, because ML algorithms generally operate on continuous data structures, process (b) requires an initial step of computing a graph embedding for G that comprises continuous feature vectors (i.e., node embeddings) for the graph's nodes.

One approach for computing this graph embedding involves collecting, at each host system 102($i$), graph connectivity information—or more specifically, random walk data—for its VMs 106($i$)(1)-106($i$)($m_i$), where the random walk data for a given VM identifies a set of other VMs (referred to as a "local neighborhood") which are connected to that VM in graph G, as determined via a random walk procedure. Upon collecting this random walk data, each host system 102($i$) can transmit it to management server 108. Management server 108 can then aggregate the random walk data received from host systems 102(1)-102($n$) and execute, in a centralized fashion, an optimization algorithm on the aggregated data (such as, e.g., an iterative stochastic gradient descent (SGD) algorithm) that outputs node embeddings for graph G which encode the geometric structure of the graph.

Unfortunately, there are two issues with this approach. First, it requires each host system 102($i$) to send the entirety of its random walk data to management server 108, which can consume a significant amount of bandwidth on physical network 110 if each host system has a large number of VMs (and/or if computing environment 100 comprises a large number of host systems). Second, because the storage of all random walk data and the entire graph embedding computation is centralized on management server 108, server 108 can become a bottleneck if it does not have sufficient storage and/or compute resources to handle the computation.

Figure 2:
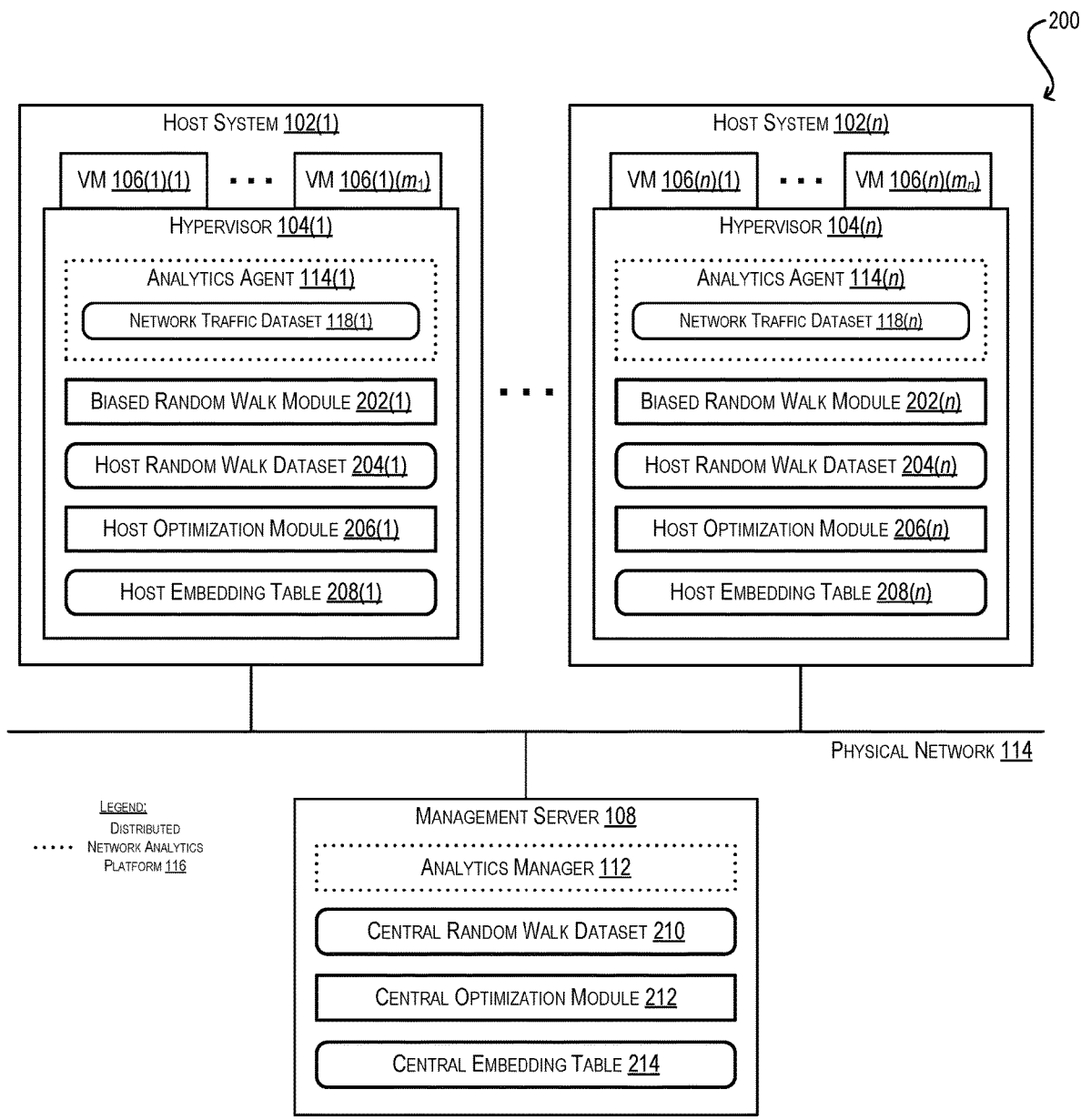
FIG. 2 depicts a version of the computing environment of FIG. 1 that implements the techniques of the present disclosure.

To address the foregoing and other similar issues, FIG. 2 depicts an enhanced version of computing environment 100 (i.e., computing environment 200) that implements a novel architecture for computing the graph embedding for graph G in a distributed, rather than centralized, fashion. As shown in FIG. 2, this architecture includes, in the hypervisor of each host system 102($i$), a biased random walk module 202($i$), a host random walk dataset 204($i$), a host optimization module 206($i$), and a host embedding table 208($i$). The architecture further includes, in management server 108, a central random walk dataset 210, a central optimization module 212, and a central embedding table 214.

As explained in further detail in section (3) below, with components 202-214 in place, each host system 102($i$) can perform the random walks for its VMs 106($i$)(1)-106($i$)($m_i$) using a biased strategy such that, for each VM 106($i$)($j$) where j=1, . . . $m_i$, the random walk(s) starting at VM 106($i$)($j$) are more likely to traverse to other VMs running on host system 102($i$) (i.e., the same host system as VM 106($i$)($j$)) than to VMs running on different (i.e., remote) host systems. Each host system 102($i$) can further identify, based on its collected random walk data, which of its VMs 106($i$)(1)-106($i$)($m_i$) are "localized" (i.e., have local neighborhoods fully contained within host system 102($i$)) and "non-localized" (i.e., have local neighborhoods that cross host system boundaries).

For localized VMs, each host system 102($i$) can compute their node embeddings in a local and mostly independent manner via a shared instance of a distributed, iterative SGD algorithm. One example of such an algorithm is "Hogwild!" (disclosed in "Hogwild!: A Lock-Free Approach to Parallelizing Stochastic Gradient Descent," F. Niu, B. Recht, C. Re and S. Wright, Proceedings of the 24th International Conference on Neural Information Processing Systems (NeuRIPs) 2011, which is incorporated herein by reference for all purposes). Each host system 102($i$) is able to compute the node embeddings for such localized VMs independently because they are not reliant on the random walk data or node embeddings of VMs that reside on remote host systems.

On the other hand, for non-localized VMs, each host system 102($i$) can transmit their respective random walk data entries to management server 108. Management server 108 can then compute the node embeddings for these non-localized VMs using the same distributed SGD algorithm instance employed by the host systems, based on the received random walk data and node embedding updates retrieved by management server 108 in each SGD iteration for the non-localized VMs' local neighbors.

With this distributed approach, a number of advantages are achieved. First, the network bandwidth needed for computing the graph embedding for graph G is kept low because each host system 102($i$) computes a certain subset of G's node embeddings—namely, the node embeddings for the host system's localized VMs—in a largely independent manner. The only information that is transferred between machines is random walk data and per-SGD iteration node embedding updates pertaining to non-localized VMs, which should be relatively small in volume due to the biased random walk procedure.

Second, due to the way in which this approach distributes the graph embedding computation among host systems 102(1)-102($n$) and the management server 108, the storage and compute requirements for the computation are effectively load balanced across these machines. This improves overall performance and prevents any single machine from becoming a bottleneck in terms of storage or compute resources.

It should be appreciated that FIGS. 1 and 2 are illustrative and not intended to limit embodiments of the present disclosure. For example, although these figures depict a particular arrangement of entities and components within computing environments 100 and 200, other arrangements are possible (e.g., the functionality attributed to a particular entity/component may be split into multiple entities/components, entities/components may be combined, etc.). Further, the various entities/components shown may include sub-components and/or functions that are not specifically described. One of ordinary skill in the art will recognize other variations, modifications, and alternatives.

3. Distributed Graph Embedding Computation Workflow

Figure 3A:
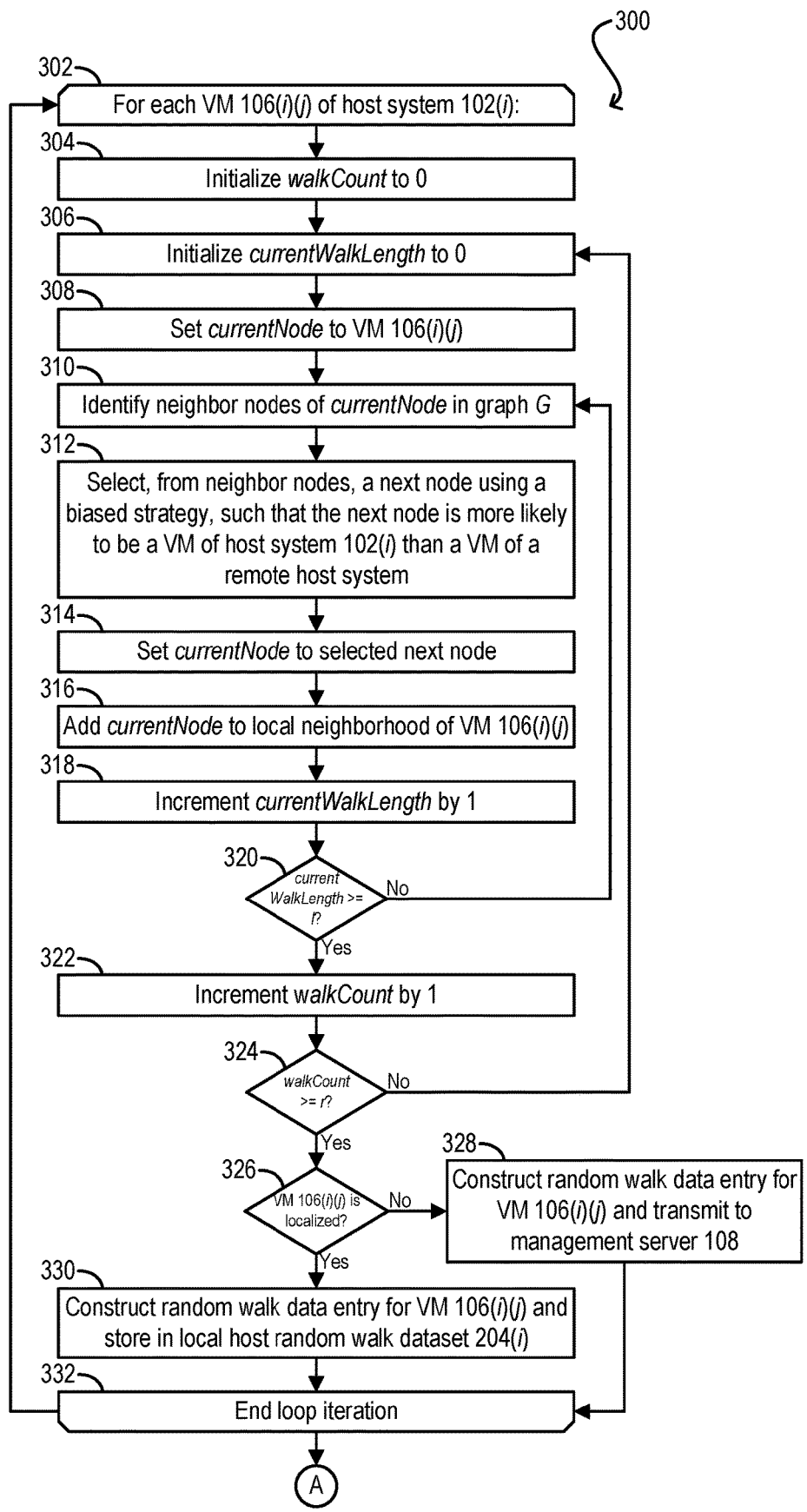
FIGS. 3A and 3B depict a flowchart for computing, in a distributed fashion, a graph embedding for a graph representing network traffic in a virtual network according to certain embodiments.
Figure 3B:
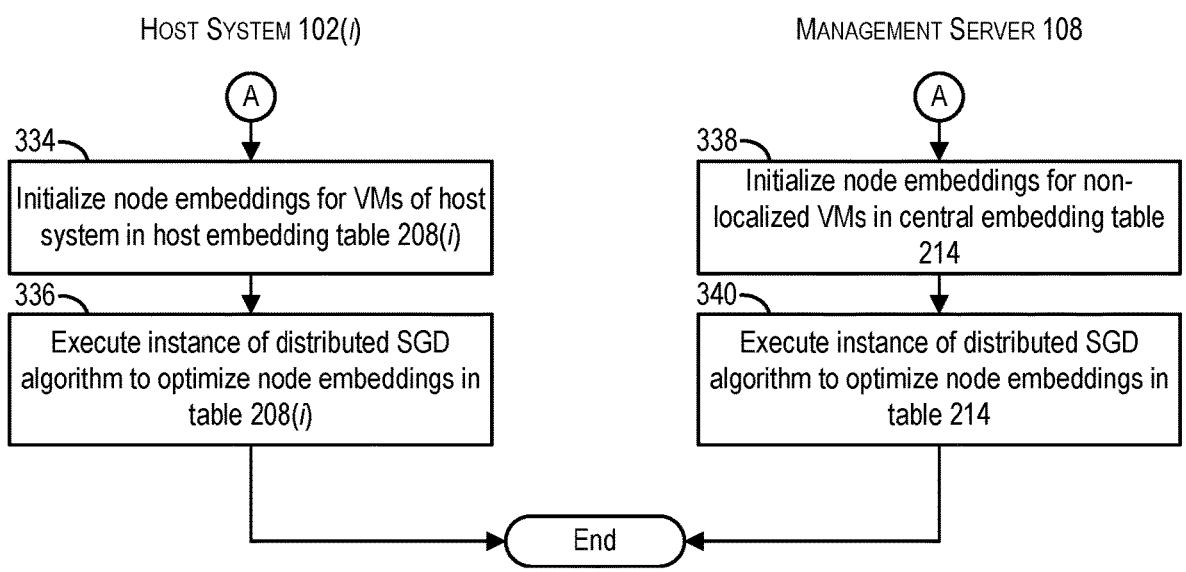

FIGS. 3A and 3B depict a workflow 300 that can be executed by host systems 102(1)-102($n$) and management server 108 of FIG. 2, in accordance with their constituent components 202-214, for computing a graph embedding for graph G (i.e., the graph representing the network traffic in virtual network X) in a distributed fashion according to certain embodiments. In particular, FIG. 3A depicts steps that can be performed by the biased random walk module 202(i) of each host system 102(i) for executing biased random walks with respect to its VMs 106(i)(1)-106(i)(m$_i$) and transmitting random walk data entries for non-localized VMs to management server 108, and FIG. 3B depicts steps that can be performed by the host/central optimization modules 206(i)/212 of each host system 102(i) and management server 108 for collectively carrying out an instance of a distributed, iterative SGD algorithm on their respective random walk data.

Starting with block 302 of FIG. 3A, biased random walk module 202(i) of host system 102(i) can enter a loop for each VM 106(i)(j) (where j=1, . . . , m$_i$) running on that host system. Within this loop, biased random walk module 202(i) can initialize a walkCount variable and a currentWalkLength variable to 0 (blocks 304 and 306) and begin a random walk originating from VM 106(i)(j) by setting a currentNode variable to VM 106(i)(j) (block 308).

At block 310, biased random walk module 202(i) can identify a set of neighbor nodes (i.e., VMs) of currentNode in graph G (block 310). These neighbor nodes are graph nodes that are directly connected to currentNode via a graph edge. Biased random walk module 202(i) can then select, from among the set of neighbor nodes, a next node that represents the next traversal location for the random walk, where the selection of the next node is biased to select a VM of host system 102(i) rather than a VM of a different/remote host system (block 312). For example, assume there are two VMs VM$_B$ and VM$_C$ in the set of neighbor nodes identified at block 310 and VM$_B$ runs on host system 102(i) while VM$_C$ runs on a remote host system 102(k). In this case, biased random walk module 202(i) may assign weights to VM$_B$ and VM$_C$ respectively that cause it to select VM$_B$ as the next node with a higher probability than VM$_C$. The specific values of these weights can be derived from one or more biasing parameters that are predetermined by, e.g., an administrator of computing environment 200.

Upon selecting one of the neighbor nodes as the next node, biased random walk module 202(i) can set the currentNode variable to the selected next node (thereby "traversing" to that node) (block 314) and can add currentNode to a local neighborhood for VM 106(i)(j) (block 316). Biased random walk module 202(i) can further increment the currentWalkLength variable by 1 (block 318) and check whether currentWalkLength now exceeds a constant 1 that corresponds to the maximum allowable random walk length (block 320). If the answer is no, biased random walk module 202(i) can return to block 310 and continue extending the current random walk.

If the answer at block 320 is yes (which means the current random walk has reached its end), biased random walk module 202(i) can increment the walkCount variable by 1 (block 322) and check whether walkCount now exceeds a constant r that corresponds to the maximum allowable number of random walks per VM (block 324). If the answer is no, biased random walk module 202(i) can return to block 306 and initiate a new random walk for VM 106(i)(j).

If the answer at block 324 is yes, biased random walk module 202(i) can conclude that all of the random walks for VM 106(i)(j) have been completed and proceed with checking whether the local neighborhood for VM 106(i)(j) solely includes VMs running on host system 102(i) (or in other words, whether the VM is a localized VM) (block 326).

If the answer at block 326 is no (which means VM 106(i)(j) is a non-localized VM whose local neighborhood includes at least one VM running on a remote host system), biased random walk module 202(i) can construct a random walk data entry identifying VM 106(i)(j) and its local neighborhood and transmit the data entry to management server 108 (block 328). For instance, if VM 106(i)(j) is named "VM$_A$" and its local neighborhood includes "VM$_B$" and "VM$_D$", this data entry can take the form "VM$_A$ VM$_B$, VM$_D$". In response, management server 108 can store the random walk data entry in its central random walk dataset 210 (not shown).

Alternatively, if the answer at block 326 is yes (which means the local neighborhood of VM 106(i)(j) is fully contained within host system 102(i)), biased random walk module 202(i) can construct the random walk data entry for VM 106(i)(j) and store it locally in host random walk dataset 204(i) (block 330). Biased random walk module 202(i) can then reach the end of the current loop iteration (block 332) and repeat loop 302 for the remaining VMs of host system 102(i).

Turning now to FIG. 3B, at block 334, host optimization module 206(i) of host system 102(i) can initialize node embeddings (i.e., feature vectors) for VMs 106(i)(1)-106(i)(m$_i$) in host embedding table 208(i) with initial values that will be used as a starting point for optimization. In a particular embodiment, host optimization module 206(i) can perform this initialization by populating the node embeddings with random values.

Host optimization module 206(i) can then execute—in conjunction with the optimization modules of the other host systems and management server 108—an instance of a distributed SGD algorithm in order to refine/tune the node embeddings in its host embedding table 208(i), until those node embeddings reasonably encode the geometric characteristics of their corresponding nodes/VMs in graph G (block 336). Although an exhaustive explanation of how this distributed SGD algorithm operates is beyond the scope of the present disclosure, it generally entails optimizing, over a series of iterations, the node embeddings in a manner that minimizes a cost function L such as:

$$\mathcal{L} = \sum_{u \in V} \sum_{v \in N(u)} -\log(P(v|z_u)) \qquad \text{Listing 1}$$

In the equation above, V is the set of nodes in graph G, N(u) is the set of nodes/VMs in the local neighborhood of node u, $z_u$ is the node embedding of node u, and $P(v|z_u)$ is the probability of visiting node v via a random walk starting from node u. Thus, by minimizing cost function L, the node embeddings for the nodes in V are optimized to maximize the likelihood of pairwise (i.e., [u, v]) random walk co-occurrences, which in turn enables the node embeddings to reflect the similarities of their corresponding nodes (as determined via the random walk data).

In parallel, at block 338, central optimization module 212 of management server 108 can initialize node embeddings in central embedding table 214 for the non-localized VMs of host systems 102(1)-102(n) (i.e., the VMs whose random walk data entries are stored in central random walk dataset 210) with initial values in a manner similar to block 334. Central optimization module 212 can then participate in the same distributed SGD instance executed by host systems 102(1)-102(n) to refine/tune the node embeddings in its central embedding table 214 (block 340). Once this distributed SGD instance has completed on both the host and management server sides, workflow 300 can end. At the conclusion of this workflow, the combined contents of the host and central embedding tables at host systems 102(1)-102(n) and management server 108 will contain the final node embeddings for all of the nodes of graph G.

It should be noted that the computation of the node embeddings in central embedding table 214 of management server 108 at each iteration of the SGD instance may rely on current node embeddings for certain VMs that are maintained in the host embedding tables of one or more host systems. In these cases, central optimization module 212 can retrieve, at the start of each iteration, the latest node embeddings for those VMs from the corresponding host systems so that they can be used by module 212 as part of its local computation.

For example, assume management server 108 received a random walk data entry for a $VM_E$ from host system 102(1) (which means that $VM_E$ is a non-localized VM of host system 102(1)) and the local neighborhood of $VM_E$ includes a localized VM of host system 102(1) (e.g., $VM_F$) and a localized VM of host system 102(2) (e.g., $VM_G$). In this scenario, management server 108 will need the latest node embeddings for $VM_F$ and $VM_G$ at each SGD iteration in order to compute/optimize the node embedding for $VM_E$; however, since $VM_F$ and $VM_G$ are localized VMs of host systems 102(1) and 102(2) respectively, each of these host systems will independently compute/optimize the node embeddings for these VMs per block 336 of workflow 300. Accordingly, at the start of each SGD iteration, management server 108 can retrieve the latest node embedding for $VM_F$ from host system 102(1) and the latest node embedding for $VM_G$ from host system 102(2) and use these node embeddings during the iteration to update the node embedding for $VM_E$.

Further, in certain embodiments management server 108 may, at the end of each SGD iteration, transmit the latest node embeddings that it has computed for non-localized VMs to the host systems on which those VMs run. This allows the receiving host systems to consider the latest node embeddings for those non-localized VMs (as computed at management server 108) when computing node embeddings for localized VMs that include those non-localized VMs in their local neighborhoods.

4. Example Scenario

Figure 4:
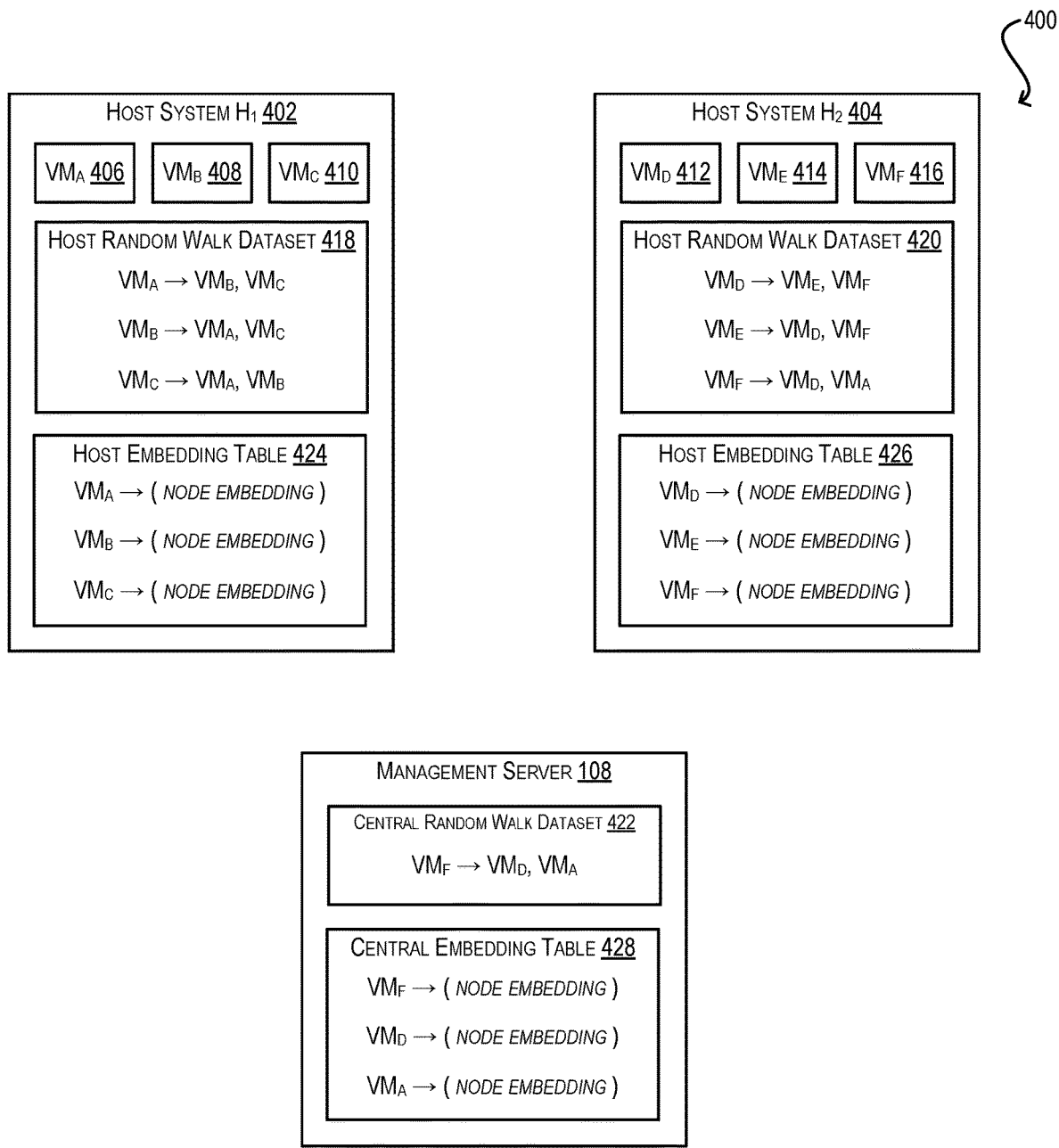
FIG. 4 depict an example scenario according to certain embodiments.

To further clarify how random walk and node embedding data will be distributed across host systems 102(1)-102(n) and management server 108 via workflow 300, FIG. 4 depicts an example scenario comprising two host systems $H_1$ (402) and $H_2$ (404) that assumes:

1. Host system $H_1$ includes three VMs $VM_A$ (406), $VM_B$, (408), and $VM_C$ (410)
2. Host system $H_2$ includes three VMs $VM_D$ (412), $VM_E$ (414), and $VM_F$ (416)
3. The local neighborhood determined for $VM_A$ of $H_1$ is $(VM_B, VM_C)$
4. The local neighborhood determined for $VM_B$ of $H_1$ is $(VM_A, VM_C)$
5. The local neighborhood determined for $VM_C$ of $H_1$ is $(VM_A, VM_B)$
6. The local neighborhood determined for $VM_D$ of $H_2$ is $(VM_E, VM_F)$
7. The local neighborhood determined for $VM_E$ of $H_2$ is $(VM_D, VM_F)$
8. The local neighborhood determined for $VM_F$ of $H_2$ is $(VM_D, VM_A)$ As shown in FIG. 4, this scenario result in (a) three entries "$VM_A \rightarrow VM_B$, $VM_C$", "$VM_B \rightarrow VM_A$, $VM_C$", and "$VM_C \rightarrow VM_A$, $VM_B$" in the host random walk dataset of $H_1$ (418) (because $VM_A$, $VM_B$, and $VM_C$ are localized VMs of $H_1$); (b) two entries "$VM_D \rightarrow VM_E$, $VM_F$" and "$VM_E \rightarrow VM_D$, $VM_F$" in the host random walk dataset of $H_2$ (420) (because $VM_D$ and $VM_E$ are localized VMs of $H_2$); and (c) one entry "$VM_F \rightarrow VM_D$, $VM_A$" in the central random walk dataset of management server 108 (422) (because $VM_F$ is a non-localized VM of $H_2$ and thus is transferred to management server 108).

Further, the host embedding table of $H_1$ (424) is populated with node embeddings for $VM_A$, $VM_B$, and $VM_C$ (of which all three will be initialized and optimized locally at $H_1$) and the host embedding matrix of $H_2$ (426) is populated with node embeddings for $VM_D$, $VM_E$, and $VM_F$ (of which only the first two will be initialized and optimized locally at $H_2$; the third will be received at the end of each SGD iteration from management server 108). The central embedding table of central server 108 (428) is populated with node embeddings for $VM_F$, $VM_D$, and $VM_A$ (of which only the first will be initialized and optimized locally at management server 108; the remaining two will be retrieved from $H_1$ and $H_2$ respectively at the start of each SGD iteration).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
performing, by a host system in a plurality of host systems, a random walk along a graph representing network traffic in a virtual network, the virtual network comprising a plurality of virtual machines (VMs) running on the plurality of host systems, the random walk starting from a node of the graph corresponding to a VM running on the host system,
constructing, by the host system based on the random walk, a local neighborhood of VMs associated with the VM;
determining, by the host system based on the local neighborhood, whether the VM is a localized VM; and
upon determining that the VM is not a localized VM, transmitting, by the host system, a random walk data entry identifying the VM and the local neighborhood to a server communicatively coupled with the plurality of host systems.

2. The method of claim 1 wherein determining whether the VM is a localized VM comprises:
determining whether the local neighborhood solely includes VMs running on the host system.

3. The method of claim 1 wherein performing the random walk comprises:
identifying a set of neighbor nodes that are directly connected to the node corresponding to the VM in the graph; and
selecting a next node for the random walk from among the set of neighbor nodes, wherein the selecting is performed using a biased strategy such that the host system is more likely to select, as the next node, a neighbor node corresponding to another VM running on the host system over a neighbor node corresponding to a VM running on another host system.

4. The method of claim 1 further comprising:
upon determining that the VM is a localized VM, storing, by the host system, the random walk data entry in a host random walk dataset maintained on the host system.

5. The method of claim 4 further comprising:
computing, by the host system, a node embedding for the node corresponding to the VM, the computing comprising executing an instance of a distributed stochastic gradient descent (SGD) algorithm that is configured to optimize the node embedding over a series of iterations based on the random walk data entry maintained in the host random walk dataset and node embeddings for nodes corresponding to the local neighborhood of VMs.

6. The method of claim 1 wherein the server computes a node embedding for the node corresponding to the VM by executing an instance of a distributed stochastic gradient descent (SGD) algorithm, the distributed SGD algorithm being configured to optimize the node embedding over a series of iterations based on the random walk data entry transmitting by the host system and node embeddings for nodes corresponding to the local neighborhood of VMs.

7. The method of claim 6 wherein the server retrieves the node embeddings for the nodes corresponding to the local neighborhood of VMs from one or more host systems in the plurality of host systems at the start of each of the series of iterations.

8. A non-transitory computer readable storage medium having stored thereon program code executable by a host system in a plurality of host systems, the program code causing the host system to execute a method comprising:
performing a random walk along a graph representing network traffic in a virtual network, the virtual network comprising a plurality of virtual machines (VMs) running on the plurality of host systems, the random walk starting from a node of the graph corresponding to a VM running on the host system,
constructing, based on the random walk, a local neighborhood of VMs associated with the VM;
determining, based on the local neighborhood, whether the VM is a localized VM; and
upon determining that the VM is not a localized VM, transmitting a random walk data entry identifying the VM and the local neighborhood to a server communicatively coupled with the plurality of host systems.

9. The non-transitory computer readable storage medium of claim 8 wherein determining whether the VM is a localized VM comprises:
determining whether the local neighborhood solely includes VMs running on the host system.

10. The non-transitory computer readable storage medium of claim 8 wherein performing the random walk comprises:
identifying a set of neighbor nodes that are directly connected to the node corresponding to the VM in the graph; and
selecting a next node for the random walk from among the set of neighbor nodes, wherein the selecting is performed using a biased strategy such that the host system is more likely to select, as the next node, a neighbor node corresponding to another VM running on the host system over a neighbor node corresponding to a VM running on another host system.

11. The non-transitory computer readable storage medium of claim 8 wherein the method further comprises:

upon determining that the VM is a localized VM, storing the random walk data entry in a host random walk dataset maintained on the host system.

12. The non-transitory computer readable storage medium of claim 11 wherein the method further comprises:
computing a node embedding for the node corresponding to the VM, the computing comprising executing an instance of a distributed stochastic gradient descent (SGD) algorithm that is configured to optimize the node embedding over a series of iterations based on the random walk data entry maintained in the host random walk dataset and node embeddings for nodes corresponding to the local neighborhood of VMs.

13. The non-transitory computer readable storage medium of claim 8 wherein the server computes a node embedding for the node corresponding to the VM by executing an instance of a distributed stochastic gradient descent (SGD) algorithm, the distributed SGD algorithm being configured to optimize the node embedding over a series of iterations based on the random walk data entry transmitting by the host system and node embeddings for nodes corresponding to the local neighborhood of VMs.

14. The non-transitory computer readable storage medium of claim 13 wherein the server retrieves the node embeddings for the nodes corresponding to the local neighborhood of VMs from one or more host systems in the plurality of host systems at the start of each of the series of iterations.

15. A host system comprising:
a processor; and
a non-transitory computer readable medium having stored thereon program code that, when executed, causes the processor to:
perform a random walk along a graph representing network traffic in a virtual network, the virtual network comprising a plurality of virtual machines (VMs) running on a plurality of host systems including the host system, the random walk starting from a node of the graph corresponding to a VM running on the host system,
construct, based on the random walk, a local neighborhood of VMs associated with the VM;
determine, based on the local neighborhood, whether the VM is a localized VM; and
upon determining that the VM is not a localized VM, transmit a random walk data entry identifying the VM and the local neighborhood to a server communicatively coupled with the plurality of host systems.

16. The host system of claim 15 wherein the program code that causes the processor to determine whether the VM is a localized VM comprises program code that causes the processor to:
determine whether the local neighborhood solely includes VMs running on the host system.

17. The host system of claim 16 wherein the program code that causes the processor to perform the random walk comprises program code that causes the processor to:
identify a set of neighbor nodes that are directly connected to the node corresponding to the VM in the graph; and
select a next node for the random walk from among the set of neighbor nodes, wherein the selecting is performed using a biased strategy such that the host system is more likely to select, as the next node, a neighbor node corresponding to another VM running on the host system over a neighbor node corresponding to a VM running on another host system.

18. The host system of claim 15 wherein the program code further causes the processor to:
upon determining that the VM is a localized VM, store the random walk data entry in a host random walk dataset maintained on the host system.

19. The host system of claim 18 wherein the program code further causes the processor to:
compute a node embedding for the node corresponding to the VM, the computing comprising executing an instance of a distributed stochastic gradient descent (SGD) algorithm that is configured to optimize the node embedding over a series of iterations based on the random walk data entry maintained in the host random walk dataset and node embeddings for nodes corresponding to the local neighborhood of VMs.

20. The host system of claim 15 wherein the server computes a node embedding for the node corresponding to the VM by executing an instance of a distributed stochastic gradient descent (SGD) algorithm, the distributed SGD algorithm being configured to optimize the node embedding over a series of iterations based on the random walk data entry transmitting by the host system and node embeddings for nodes corresponding to the local neighborhood of VMs.

21. The host system of claim 20 wherein the server retrieves the node embeddings for the nodes corresponding to the local neighborhood of VMs from one or more host systems in the plurality of host systems at the start of each of the series of iterations.

* * * * *